(12) United States Patent
Woo et al.

(10) Patent No.: US 12,776,517 B2
(45) Date of Patent: Oct. 27, 2026

(54) METHOD FOR PRODUCING ALKALI METAL HEXAFLUOROPHOSPHATE, ALKALI METAL HEXAFLUOROPHOSPHATE, METHOD FOR PRODUCING ELECTROLYTE CONCENTRATE COMPRISING ALKALI METAL HEXAFLUOROPHOSPHATE, AND METHOD FOR PRODUCING SECONDARY BATTERY

(71) Applicant: FOOSUNG CO., LTD., Hwaseong-si (KR)

(72) Inventors: Byung Won Woo, Ulsan (KR); Soon Hong Park, Busan (KR); Hong Seok Lee, Ulsan (KR); Jae Woo Jung, Yangsan-si (KR); Hyun Gon Kim, Uiseong-gun (KR)

(73) Assignee: FOOSUNG CO., LTD. (KR)

( * ) Notice: Subject to any disclaimer, the term of this patent is extended or adjusted under 35 U.S.C. 154(b) by 793 days.

(21) Appl. No.: 16/689,044

(22) Filed: Nov. 19, 2019

(65) Prior Publication Data

US 2020/0295404 A1 Sep. 17, 2020

(30) Foreign Application Priority Data

Mar. 15, 2019 (KR) ........................ 10-2019-0030074

(51) Int. Cl.
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0025* (2013.01)

(58) Field of Classification Search
CPC ......... H01M 10/0568; H01M 10/0569; H01M 2300/0025
See application file for complete search history.

(56) References Cited

U.S. PATENT DOCUMENTS 3,607,020 A 9/1971 Smith, Jr.
2002/0084445 A1 * 7/2002 Garbe ............... H01M 10/0569 252/364
2011/0045355 A1 * 2/2011 Ichikawa .............. H01M 4/043 429/231.95
2011/0097626 A1 * 4/2011 Waki .................... C01D 15/005 429/199

(Continued)

FOREIGN PATENT DOCUMENTS

CN 102810691 A 12/2012
EP 1873861 A1 1/2008

(Continued)

*Primary Examiner* — Osei K Amponsah

(74) *Attorney, Agent, or Firm* — Renaissance IP Law Group LLP

(57) ABSTRACT

Provided are method for producing alkali metal hexafluorophosphate, alkali metal hexafluorophosphate powder, method for producing electrolyte concentrate comprising alkali metal hexafluorophosphate, and method for producing secondary battery. The method for preparing alkali metal hexafluorophosphate includes a step of obtaining an alkali metal hexafluorophosphate by reacting phosphorus pentafluoride with alkali metal fluoride in a haloformate solvent.

19 Claims, 5 Drawing Sheets

(56) References Cited

U.S. PATENT DOCUMENTS

2017/0214088 A1* 7/2017 Bomkamp .......... B61L 15/0062

FOREIGN PATENT DOCUMENTS

| | | | |
|---|---|---|---|
| EP | 2322472 | A1 | 5/2011 |
| JP | 2009292724 | A | 12/2009 |
| KR | 20130054367 | A | 5/2013 |
| WO | 9806666 | A1 | 2/1998 |
| WO | 0010917 | A1 | 3/2000 |

* cited by examiner

METHOD FOR PRODUCING ALKALI METAL HEXAFLUOROPHOSPHATE, ALKALI METAL HEXAFLUOROPHOSPHATE, METHOD FOR PRODUCING ELECTROLYTE CONCENTRATE COMPRISING ALKALI METAL HEXAFLUOROPHOSPHATE, AND METHOD FOR PRODUCING SECONDARY BATTERY

CLAIM FOR PRIORITY

This application claims priority to Korean Patent Application No. 10-2019-0030074 filed on Mar. 15, 2019 in the Korean Intellectual Property Office (KIPO), the entire contents of which are hereby incorporated by reference.

BACKGROUND

1. Technical Field

Example embodiments of the present inventive concept relates to a hexafluorophosphate salt, and more specifically to a hexafluorophosphate salt that can be used in an electrolyte of a secondary battery, etc.

2. Related Art

Recently, rechargeable batteries are becoming a core component from mobile electric appliances such as mobile phones, laptop computers, and wireless electric appliances such as vacuum cleaners to electric vehicles, and demand for it is expected to increase continuously.

A secondary battery, for example a lithium secondary battery works on the principle that lithium ions contained in a cathode active material move to an anode through an electrolyte, and then are inserted into a layered structure of an anode active material (charge), and then lithium ions that have been inserted into a layered structure of the anode active material are returned to the cathode (discharging). In the electrolyte, lithium salt is dissolved in a solvent, and lithium hexafluorophosphate having high stability and excellent electrical properties is mainly used as the lithium salt.

Lithium hexafluorophosphate has been manufactured using a variety of methods, but there is still a need for a manufacturing method that can further improve yield and purity while lowering costs.

SUMMARY

Accordingly, example embodiments of the present inventive concept provide a hexafluorophosphate-salt manufacturing method that can improve the yield and purity while lowering the cost.

Example embodiments of the present inventive concept provide a method for preparing alkali metal hexafluorophosphate including a step of obtaining the alkali metal hexafluorophosphate by reacting phosphorus pentafluoride with alkali metal fluoride in a haloformate solvent represented by Formula 1 below.

[Formula 1]

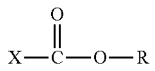

In Formula 1, X is a halogen group, R is an alkyl group having 1 to 6 carbon atoms, an alkenyl group having 2 to 6 carbon atoms, or an aryl group having 5 to 6 ring atoms.

X may be Cl, R may be an alkyl group having 1 to 3 carbon atoms, and R may be a methyl group or an ethyl group. The alkali metal fluoride may be LiF, and the alkali metal hexafluorophosphate may be $LiPF_6$.

Before reacting the phosphorus pentafluoride with the alkali metal fluoride in the haloformate solvent, the alkali metal fluoride dispersion may be obtained by dispersing the alkali metal fluoride in a solid state in the haloformate solvent. In this case, the reaction of the alkali metal fluoride with the phosphorus pentafluoride may be performed by supplying phosphorus pentafluoride in a gaseous state into the alkali metal fluoride dispersion. Obtaining the alkali metal fluoride dispersion and reacting the alkali metal fluoride with the phosphorus pentafluoride may be performed in different reactors.

Prior to reacting the phosphorus pentafluoride with the alkali metal fluoride in the haloformate solvent, the phosphorus pentafluoride may be obtained by reacting liquid phosphorus trichloride ($PCl_3$), liquid chlorine ($Cl_2$), and liquid hydrogen fluoride (HF). Here, the phosphorus pentafluoride may be obtained in a gas mixture with hydrogen chloride, and in the step of reacting the phosphorus pentafluoride with the alkali metal fluoride in the haloformate solvent, the phosphorus pentafluoride may be supplied as a gas mixture with the hydrogen chloride. The hydrogen chloride remaining in the reaction of the phosphorus pentafluoride with the alkali metal fluoride in the haloformate solvent may be supplied into a hydrogen chloride absorber and discharged in the form of an aqueous solution of hydrogen chloride.

In case that the alkali metal fluoride dispersion is obtained by dispersing the alkali metal fluoride in a solid state in the haloformate solvent, and the step of obtaining the alkali metal fluoride dispersion and the step of reacting the alkali metal fluoride with the phosphorus pentafluoride are carried out in different reactors, the phosphorus pentafluoride and hydrogen chloride mixture remaining in the reaction of the alkali metal fluoride and the phosphorus pentafluoride may be fed into the reactor where the step of obtaining an alkali metal fluoride dispersion is performed. At this time, the phosphorus pentafluoride in the mixture may be reacted with the alkali metal fluoride in the alkali metal fluoride dispersion, and the remaining hydrogen chloride may be supplied into the hydrogen chloride absorber and discharged in the form of an aqueous solution of hydrogen chloride.

The alkali metal hexafluorophosphate may be precipitated in a solid state in the haloformate solvent. The precipitated alkali metal hexafluorophosphate may be filtered to separate alkali metal hexafluorophosphate, and the separated alkali metal hexafluorophosphate may be dried under reduced pressure.

The alkali metal hexafluorophosphate may be precipitated as crystal particles in an ellipsoid form. At least one of the three semiprincipal axes of the ellipsoid-shaped crystal particles may have different lengths from the other(s) or all of the semiprincipal axes may have different lengths. The length of the semiprincipal axis may be several hundred micrometers in size.

Example embodiments of the present inventive concept provide an alkali metal hexafluorophosphate. The alkali metal hexafluorophosphate is in a form of an ellipsoidal-shaped crystal particle. At least one of the three semiprincipal axes of the ellipsoid-shaped crystal particle may have different lengths from the other(s) or all of the semiprincipal axes have different lengths. The length of the semiprincipal axis may be several hundred micrometers in size. The alkali metal hexafluorophosphate may have a purity of 98 to 99.999%, may contain 20 to 100 wt ppm of free hydrofluoric acid, and may contain 5 to 10 wt ppm of water. The alkali metal hexafluorophosphate may be $LiPF_6$.

Example embodiments of the present inventive concept provide a method for preparing an electrolytic concentrate containing an alkali metal hexafluorophosphate. The method comprises dissolving the alkali metal hexafluorophosphate obtained by the above-described method or the alkali metal hexafluorophosphate described above in a non-aqueous organic solvent to obtain an alkali metal hexafluorophosphate solution. The alkali metal hexafluorophosphate solution is concentrated into a saturated solution. The non-aqueous organic solvent may be an acyclic- or cyclic-carbonate ester, a lactone, an acyclic- or a cyclic-ether, or a mixture thereof. The method may further include diluting the saturated solution of the alkali metal hexafluorophosphate by adding the non-aqueous organic solvent.

Example embodiments of the present inventive concept provide a secondary battery manufacturing method. The secondary battery manufacturing method comprises obtaining an alkali metal hexafluorophosphate solution by dissolving the alkali metal hexafluorophosphate obtained by the above-described method or the alkali metal hexafluorophosphate described above, or by using the electrolytic concentrate containing the alkali metal hexafluorophosphate. The alkali metal hexafluorophosphate solution is introduced as an electrolyte between a negative electrode active material layer and a positive electrode active material layer. The non-aqueous organic solvent may be an acyclic- or cyclic-carbonate ester, a lactone, an acyclic- or a cyclic-ether, or a mixture thereof.

BRIEF DESCRIPTION OF DRAWINGS

Example embodiments of the present inventive concept will become more apparent by describing in detail example embodiments of the present inventive concept with reference to the accompanying drawings, in which.

DESCRIPTION OF EXAMPLE EMBODIMENTS

Figure 1:
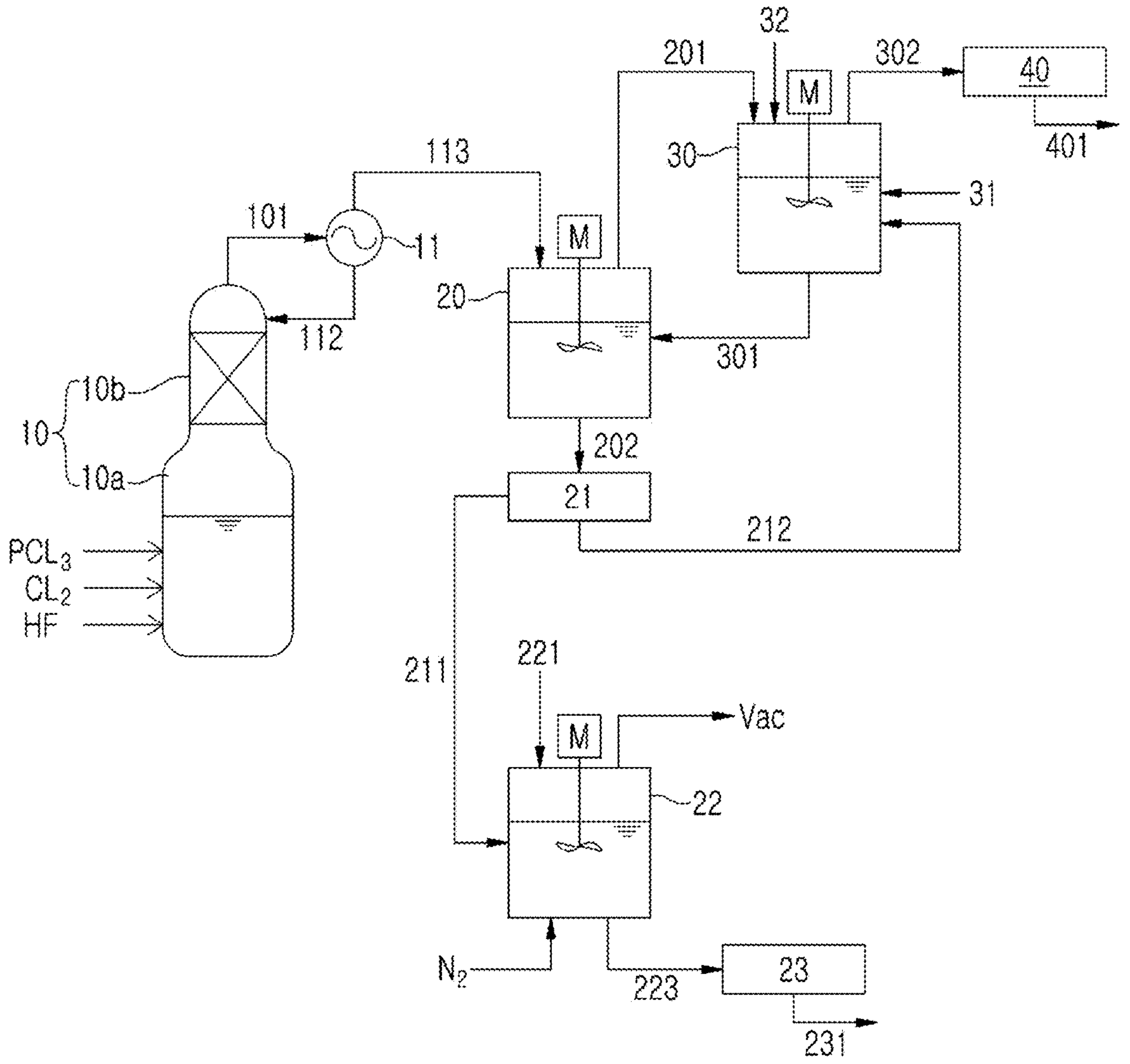
FIG. 1 is a manufacturing process diagram showing a method for preparing a phosphorus pentafluoride ($PF_5$), hexafluorophosphate salt ($MPF_6$), and hexafluorophosphate salt ($MPF_6$)-containing electrolytic concentrate according to an embodiment of the present inventive concept.

Hereinafter, to more fully explain the present inventive concept, embodiments according to the present inventive concept will be described in further detail with reference to the accompanying drawings. However, the present inventive concept may be embodied in different forms without limitation to the embodiments explained herein. Like reference numerals denote like elements throughout the specification. In the specification, the sentence "a first layer is disposed "on" a second layer" means that these layers are in direct contact with each other, and a third layer(s) is/are disposed between these layers. In the present embodiments, "first", "second", or "third" is not intended to impose any limitation on the components, but should be understood as a term for distinguishing the components.

As used herein, unless otherwise defined, "alkyl" refers to an aliphatic hydrocarbon group and may be "saturated alkyl" that does not include a double bond or a triple bond.

As used herein, unless otherwise defined, "alkenyl" may be a monovalent group of an alkene which is a hydrocarbon having at least one carbon-carbon double bond.

As used herein, unless otherwise defined, an "aryl" may refer to an aromatic hydrocarbon group containing 1 to 5 rings which may be linked or fused.

In the case where the carbon number or the atom number "X to Y" is described herein, the case having a number corresponding to all integers between X and Y should also be interpreted as being described together.

In the present specification, when "X to Y" is described, the number corresponding to all integers between X and Y should be interpreted as being described together.

The term "anhydrous HF" means hydrogen fluoride containing 10 wt ppm or less of water, but the method of the present inventive concept can also use HF containing 100 wt ppm or less of water.

Figure 2:
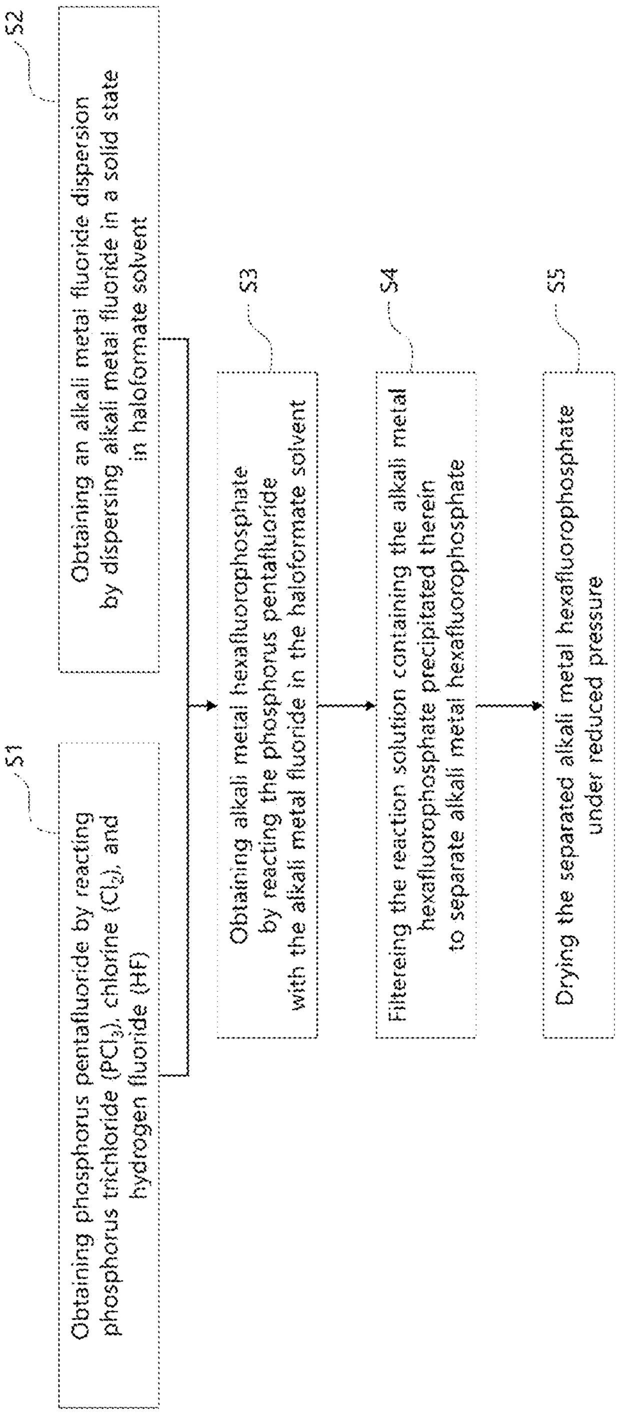
FIG. 2 is a flow chart showing a method for preparing a phosphorus pentafluoride ($PF_5$) and hexafluorophosphate salt ($MPF_6$) according to an embodiment of the present inventive concept.

FIG. 1 is a manufacturing process diagram showing a method for preparing a phosphorus pentafluoride ($PF_5$), hexafluorophosphate salt ($MPF_6$), and hexafluorophosphate salt ($MPF_6$)-containing electrolytic concentrate according to an embodiment of the present inventive concept. FIG. 2 is a flow chart showing a method for preparing a phosphorus pentafluoride ($PF_5$) and hexafluorophosphate salt ($MPF_6$) according to an embodiment of the present inventive concept.

Preparing Method of Phosphorus Pentafluoride ($PF_5$)

Referring to FIGS. 1 and 2, phosphorus pentafluoride ($PF_5$) may be produced in the first reactor 10. Specifically, the first reactor 10 may be a reaction distillation apparatus including a reaction unit 10*a* and a distillation unit 10*b*. However, the present inventive concept is not limited thereto, and the first reactor 10 may have a structure in which a distillator is connected to the autoclave.

Phosphorus pentafluoride ($PF_5$) may be produced by reacting phosphorus trichloride ($PCl_3$), chlorine ($Cl_2$), and hydrogen fluoride (HF) (S1). Phosphorus trichloride ($PCl_3$), chlorine ($Cl_2$), and hydrogen fluoride (HF) may be supplied to the first reactor 10, specifically the reaction unit 10*a*. Here, HF may be anhydrous HF. Thereafter, the reaction according to the following Scheme 1 may be performed in the reaction unit 10*a* to generate phosphorus pentafluoride ($PF_5$) and hydrogen chloride (HCl).

[Scheme 1]

$$PCl_3(l)+Cl_2(l)+5HF(l)\rightarrow PF_5(g)+5HCl(g)$$

When $PCl_3$, $Cl_2$, and HF are fed, the molar ratio of $HF/PCl_3$ may be between 5 and 5.5, and the molar ratio of $Cl_2/PCl_3$ may be between 1 and 1.5. The reaction according to Scheme 1 may proceed until all $PCl_3$ is consumed.

In this case, the first reactor 10 may be in a temperature and pressure range such that the reactants $PCl_3$, $Cl_2$, and HF maintain a liquid state, and the products $PF_5$ and HCl may have a gaseous state. Specifically, the first reactor 10 may be within a temperature range of −20 to 30° C. and a pressure range of 5.0 to 30 kg/cm$^2$g. $Cl_2$ may be supplied in a gaseous state or a liquid state.

The mixture of gaseous $PF_5$ and HCl, the product of the reaction, may additionally include vaporized $Cl_2$ and vaporized HF from the remaining reactants and include $POF_3$, which may be produced when water is incorporated into the reactants. These reaction products may pass through the distillation unit (**10*b*), and then may flow into a condenser 11 through line 101, the mixture of $Cl_2$, HF, and $POF_3$ liquefied in the condenser 11 may be refluxed into the first reactor 10 through line 112, and $PF_5$ and HCl mixture having improved purity may be discharged from the condenser 11 through line 113** in gaseous state.

Preparing Method of Hexafluorophosphate Salt ($MPF_6$)

Hexafluorophosphate salt may be prepared through the following Scheme 2.

[Scheme 2]

$$MF(s)+PF_5(g)\rightarrow MPF_6(s)$$

In Scheme 2, M may be an alkali metal, specifically Li, Na, or K. As an example, the MF (alkali metal fluoride) may be LiF, NaF, or KR In addition, the reaction of Scheme 2 may be performed in an organic solvent represented by Formula 1, that is, a haloformate-based solvent. In other words, the hexafluorophosphate salt specifically, the alkali metal hexafluorophosphate may be produced by reacting the phosphorus pentafluoride with the alkali metal fluoride in the haloformate solvent (S3).

[Formula 1]

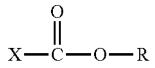

In Formula 1, X may be a halogen group, specifically, F, Cl, Br, or I. In one example, X may be Cl. R may be an alkyl group having 1 to 6 carbon atoms, an alkenyl group having 2 to 6 carbon atoms, or an aryl group having 5 to 6 ring atoms. The alkyl group may be a linear alkyl group. Furthermore, the alkyl group may be an alkyl group having 1 to 3 carbon atoms. More specifically, the alkyl group may be an alkyl group having 1 to 2 carbon atoms, that is, a methyl group or an ethyl group. The alkenyl group may also be a linear alkenyl group. Furthermore, the alkenyl group may be an alkenyl group having 2 to 3 carbon atoms, specifically vinyl group or an allyl group. The aryl group may be a phenyl group.

The organic solvent may be methyl chloroformate, ethyl chloroformate, vinyl chloroformate, n-propyl chloroformate, allyl chloroformate, n-butyl chloroformate, n-hexyl chloroformate, phenyl chloroformate, or a mixture thereof.

Before reacting the phosphorus pentafluoride with the alkali metal fluoride in the haloformate solvent, an alkali metal fluoride (MF) dispersion may be obtained by dispersing alkali metal fluoride (MF) in a solid state in the haloformate solvent (S2). Specifically, after supplying the haloformate-based solvent represented by the Formula 1 through line 31 in a second reactor 30 equipped with a stirrer, the solid state MF is supplied through a line 32, and MF dispersion in the form of a slurry may be obtained by uniformly dispersing the solid MF in the haloformate solvent. The MF dispersion may contain about 15 to 40 wt % MF, for example 25 to 30 wt % MF.

Thereafter, in one example, after introducing $PF_5$ in a gaseous state into the same reactor 30, the reaction of Scheme 2 may be performed. In another example, the MF dispersion may be supplied to a third reactor 20 through line 301, and the reaction of Scheme 2 may be performed after introducing the gaseous $PF_5$ into the third reactor 20. In the reaction, MF may be introduced at a chemical equivalent and $PF_5$ may be introduced at a chemical equivalent or in excess. Specifically, the molar ratio of $PF_5$/MF may be 1 to 1.5. In one example, the $PF_5$ may be supplied as a gas mixture of $PF_5$ and HCl fed from the condenser 11 via line 113.

In the third reactor 20, $PF_5$ is rapidly reacted with MF in the dispersion, and hexafluorophosphate salt or alkali metal hexafluorophosphate ($MPF_6$) may be precipitated as a solid, for example, as a crystal. The hexafluorophosphate salt has very low or little solubility in the haloformate-based solvent represented by Formula 1, and may be precipitated as crystals in the haloformate-based solvent represented by Formula 1. The above method does not require any concentration process to obtain the hexafluorophosphate salt as a crystal. This can result in a cost reduction and yield improvement as compared to the conventional method of preparing hexafluorophosphate salt which uses a solvent in which hexafluorophosphate salt is easy to dissolve, therefore requires an additional concentration process at a relatively high temperature to obtain hexafluorophosphate salt as a crystal. Furthermore, free hydrofluoric acid, which is an impurity, may be generated as the hexafluorophosphate salt is thermally decomposed due to the high temperature in the concentration process in the conventional method. As the concentration process is omitted in this embodiment, the content of impurities such as free hydrofluoric acid may be reduced. It can improve the purity of hexafluorophosphate salt.

In the reactor performing the reaction according to Scheme 2, temperature may be maintained at −15 to 40° C. and pressure may be maintained at 0 to 5 kg/cm$^2$g. In the temperature and pressure range of the reactor, a high purity hexafluorophosphate salt may be obtained, the color change of the solvent by heat may be prevented, and the formation of free hydrofluoric acid may be suppressed in the reactor.

The remaining $PF_5$ after the reaction may be discharged through line 201 from the reactor 20. When $PF_5$ is supplied via line 113 as a gas mixture with HCl to the third reactor 20, the content of $PF_5$ in the gas mixture exiting through line 201 after the reaction can be significantly reduced.

The reaction solution containing hexafluorophosphate salt precipitated as crystals in the third reactor 20 may be supplied to a filter 21 through line 202 and filtered through the filter 21 to separate the hexafluorophosphate salt crystals from a filtrate (S4). The separated crystals may be dried under reduced pressure (S5), for example, by vacuum drying at 20 to 90° C. to obtain hexafluorophosphate salt as crystal particles. Here, the hexafluorophosphate salt crystal particles may have an ellipsoid shape. In this embodiment, the ellipsoid shape in this embodiment, even if it does not completely conform to the definition of the ellipsoid, but may have a surface that is curved and at least one of the three semiprincipal axes has a different length from the others or all three semiprincipal axes have different lengths. The length of these semiprincipal axes may be several hundred micrometer, for example, about 100 to 500 um in size.

The hexafluorophosphate salt may have a purity of 98 to 99.999 wt %, for example, 99 to 99.999 wt %, specifically 99.9 to 99.999 wt %. The hexafluorophosphate salt may contain 20 to 100 wt ppm, for example 25 to 65 wt ppm, specifically 25 to 35 wt ppm of free hydrofluoric acid, and may contain 5 to 10 wt ppm of water.

The filtrate obtained from the filter 21 may be in a state in which $PF_5$ is partially dissolved in the organic solvent of Formula 1. This filtrate may be fed back to the second reactor 30 via line 212. Thereafter, MF may be additionally supplied into the second reactor 30 through the line 32, and the supplied MF may be dispersed in the filtrate fed through the line 212, that is, the $PF_5$-containing haloformate-based solvent and haloformate-based solvent additionally supplied through the line 31. The dispersed MF may react with $PF_5$ contained in the filtrate and $PF_5$ or $PF_5$/HCl mixture discharged from the third reactor 20 via line 201. As a result, a small amount of hexafluorophosphate salt may be generated even in the second reactor 30. Thereafter, the MF dispersion containing a small amount of hexafluorophosphate salt may be fed into the third reactor 20 to perform the reaction as described above.

Meanwhile, $PF_5$ in the second reactor 30 may be almost consumed, and the gaseous product exiting the second reactor 30 may contain little or no $PF_5$ or some $PF_5$ at a very low content. The gaseous product exiting the second reactor 30 can be fed to the HCl absorber 40 via line 302, and HCl absorbed by water in the HCl absorber 40 may be discharged through line 401 as an aqueous HCl solution. In other example, wherein the HCl remaining in the reaction of the phosphorus pentafluoride with the alkali metal fluoride in the haloformate solvent in the third reactor 20 may be supplied into a HCl absorber 40 and may be discharged in the form of an aqueous solution of HCl through line 401.

Preparing Method of Hexafluorophosphate Salt ($MPF_6$)-Containing Electrolytic Concentrate The hexafluorophosphate salt crystal particles may be fed into a fourth reactor 22 via line 211. The fourth reactor 22 may be supplied with a non-aqueous organic solvent through line 221, and in the fourth reactor 22, hexafluorophosphate salt crystal particles are dissolved in the non-aqueous organic solvent while stirring to obtain a hexafluorophosphate salt solution. Here, dissolution may be performed at a temperature of 40° C. or lower to prevent decomposition of the hexafluorophosphate salt, thereby inhibiting free hydrofluoric acid generation.

The hexafluorophosphate salt solution can be concentrated to obtain a concentrated solution as a saturated solution. The concentration can be carried out in a vacuum of about 40° C. while bubbling nitrogen gas in the solution. In the process, the non-aqueous organic solvent may be evaporated, at the same time, the concentration of halo ions for example, chlorine ions derived from free hydrofluoric acid and the solvent represented by the Formula 1 may be reduced. The hexafluorophosphate salt in the obtained hexafluorophosphate salt concentrate may be contained at a concentration of about 35 to 70 wt %, for example, 40 to 55 wt %, specifically 45 to 50 wt %.

The non-aqueous organic solvent may be additionally supplied through the line 221 in the concentrate to prepare an electrolytic concentrate of about 25 to 34 wt %, for example, 29 to 33 wt %, specifically, 30 to 32 wt %. Thereafter, the concentrate may be supplied to a filter 23 through line 223 and filtered through the filter 23 to remove a trace solid metal fluoride salt, thereby obtaining a concentrate 231 having improved purity.

As an example, a solution obtained by dissolving $LiPF_6$ crystals in ethyl methyl carbonate may be concentrated to obtain a concentrate as a saturated solution. This concentrate may be at a concentration of about 45 to 50 wt %. Ethyl methyl carbonate may be further added to the concentrate to obtain an electrolytic concentrate having a concentration of 29.5 to 32.5 wt %.

Energy Storage Devices

Figure 3:
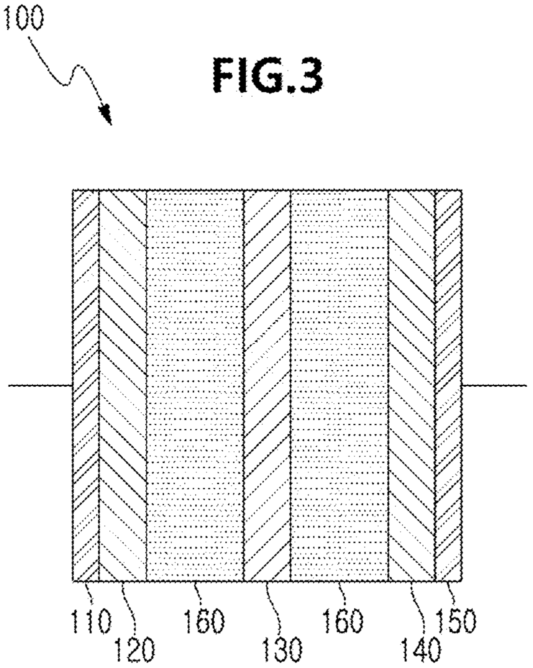
FIG. 3 is a schematic view showing a secondary battery according to an embodiment of the present inventive concept.

FIG. 3 is a schematic view showing a secondary battery according to an embodiment of the present inventive concept. In the present embodiment, the secondary battery may be an alkali ion secondary battery, for example, a lithium secondary battery, a sodium secondary battery, or a potassium secondary battery. However, it is not limited to this.

Referring to FIG. 3, the energy storage device includes the negative electrode active material layer 120, the positive electrode active material layer 140, and a separator 130 interposed therebetween. The electrolyte solution 160 may be disposed or introduced between the anode active material layer 120 and the cathode active material layer 140. The negative electrode active material layer 120 may be disposed on the negative electrode current collector 110, and the positive electrode active material layer 140 may be disposed on the positive electrode current collector 150.

The separator 130 may be a porous insulator, for example, a film laminate containing polyethylene or polypropylene, or a nonwoven fabric containing cellulose, polyester, or polypropylene.

The electrolyte solution 160 may be a non-aqueous electrolyte solution, including an electrolyte and a non-aqueous organic solvent, and the electrolyte may be $LiPF_6$ for the lithium secondary battery, $NaPF_6$ for the sodium secondary battery, or $KPF_6$ for the potassium secondary battery. For example, the electrolyte solution 160 may be obtained by diluting the aforementioned hexafluorophosphate salt ($MPF_6$)-containing electrolytic concentrate using a non-aqueous organic solvent and adding various additives thereto. As another example, the electrolyte solution 160 may be obtained by dissolving the hexafluorophosphate salt ($MPF_6$) crystal powder described above in a non-aqueous organic solvent and adding various additives thereto. The non-aqueous organic solvent may be an acyclic or cyclic carbonate ester, a lactone, an acyclic or a cyclic ether, or a mixture thereof. The acyclic carbonate ester may be dimethyl carbonate, diethyl carbonate, or methyl ethyl carbonate, and the cyclic carbonate ester may be ethylene carbonate, propylene carbonate, or butylene carbonate. The lactone may be gamma-butyrolactone or gamma-valerolactone. The ether may be an acyclic ether such as dimethoxy ethane, diethyl ether, or a cyclic ether such as tetrahydrofuran, methyl terahydrofuran or dioxane. However, the present inventive concept is not limited thereto, and the non-aqueous organic solvent may be any of the solvents in electrolyte solutions used in the secondary battery.

The negative electrode active material layer 120 includes a negative electrode active material which can intercalate/decalate alkali metal ions or causing a conversion reaction, such as metal, a metal alloy, a metal oxide, a metal fluoride, a metal sulfide, and carbon material such as natural graphite, artificial graphite, cokes, carbon black, carbon nanotubes, and graphene. The negative electrode active material layer 120 may further include a conductive material and/or a binder.

The positive electrode active material layer 140 may contain a composite oxide or a composite phosphate of an alkali metal and at least one of cobalt, manganese, nickel, aluminum, or a combination thereof. As an example, for the lithium secondary battery, the positive electrode active material may be $LiCoO_2$, $LiNiO_2$, $Li(Co_xNi_{1-x})O_2$ ($0.5 \le x < 1$), $Li(Ni_{1-x-y}Co_yMn_z)O_2$ ($0.1 \le y \le 0.5$, $0.1 \le z \le 0.5$, $0 < y+z < 1$), $Li(Ni_{1-x-y}Co_xAl_y)O_2$ ($0.05 \le y \le 0.5$, $0.05 \le z \le 0.5$, 0<y+z<1), $LiMn_2O_4$, $LiFePO_4$, or a combination of two or more thereof. The cathode active material layer 140 may further include a conductive material and/or a binder.

The positive electrode current collector 150 and the negative electrode current collector 110 may be metal having heat resistance, for example, iron, copper, aluminum, nickel, stainless steel, titanium, tantalum, gold, platinum, and the like irrespective of each other.

Hereinafter, examples are provided to help in understanding the present inventive concept. However, the following examples are merely provided to help in understanding of the present inventive concept, and the present inventive concept is not limited to the following examples.

Preparation Example of $PF_5$ 30 kg $Cl_2$ (g), 42.32 kg anhydrous HF (l), and 58.1 kg $PCl_3$ (l) were quantitatively injected into a 500 L high pressure reactor cooled to 25° C. or lower, and reacted at a pressure of 9 kg/cm$^2$g until all of the injected $PCl_3$ (l) was consumed to obtain a gas containing $PF_5$ as a product.

Preparation Example of $LiPF_6$

Preparation Example A1

As a reaction solvent, 188 kg of methyl chloroformate (ClCOOR, R: —$CH_3$) (l) was added to a PTFE-lined reactor equipped with an agitator, and then 10.7 kg of lithium fluoride (LiF) (s) was added and then stirred to disperse in the reaction solvent. When a uniform dispersion was obtained, $PF_5$ gas was introduced through the inlet tube while the reactor temperature was cooled to 0° C. or lower, and the reaction proceeded. The reaction temperature was maintained at 20° C. or lower, the pressure was maintained at 1.2 kg/cm$^2$g or lower. As LiF was consumed, lithium hexafluorophosphate ($LiPF_6$) was produced and precipitated as crystals in methyl chloroformate. The reaction was terminated when the LiF was exhausted, and the reaction solution containing $LiPF_6$ precipitated as a crystal was filtered using a filter to separate the crystals and the filtrate. The filtrate was reused in the next reaction, and the separated crystals were vacuum dried at 50 to 80° C. to obtain $LiPF_6$ as crystals.

The production of standard $LiPF_6$ was confirmed by $^{19}F$ NMR spectrum ((470.40 MHz, $CD_3CN$): d −71.48 (d, J=705.6)) and the yield was 99.9%. The purity was 99.985%, the concentration of free hydrofluoric acid was 30 ppm by weight, and the moisture was 8 ppm by weight.

Preparation Example A2

$LiPF_6$ was obtained as crystals in the same manner as in Preparation Example A1, except that 188 kg of ethyl chloroformate (ClCOOR, R: —$CH_2CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 99.9%. The purity was 99.985%, the concentration of free hydrofluoric acid was 30 ppm by weight, and the moisture was 9 ppm by weight.

Preparation Example A3

$LiPF_6$ was obtained as crystals in the same manner as in Preparation Example A1, except that 188 kg of vinyl chloroformate (ClCOOR, R: —CH═$CH_2$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 99%. The purity was 99.9%, the concentration of free hydrofluoric acid was 55 ppm by weight, and the moisture was 9 ppm by weight.

Preparation Example A4

$LiPF_6$ was obtained as crystals in the same manner as in Preparation Example A1, except that 188 kg of n-propyl chloroformate (ClCOOR, R: —$(CH_2)_2CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 99%. The purity was 99.8%, the concentration of free hydrofluoric acid was 62 ppm by weight, and the moisture was 9 ppm by weight.

Preparation Example A5

$LiPF_6$ was obtained as crystals in the same manner as in Preparation Example A1, except that 188 kg of allyl chloroformate (ClCOOR, R: —$CH_2CH$═$CH_2$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 99%. The purity was 99.1%, the concentration of free hydrofluoric acid was 60 ppm by weight, and the moisture was 10 ppm by weight.

Preparation Example A6

$LiPF_6$ was obtained as crystals in the same manner as in Preparation Example A1, except that 188 kg of n-butyl chloroformate (ClCOOR, R: —$(CH_2)_3CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 99%. The purity was 98.9%, the concentration of free hydrofluoric acid was 85 ppm by weight, and the moisture was 9 ppm by weight.

Preparation Example A7

$LiPF_6$ was obtained as crystals in the same manner as in Preparation Example A1, except that 188 kg of n-hexyl chloroformate (ClCOOR, R: —$(CH_2)_5CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 98.4%, the concentration of free hydrofluoric acid was 67 ppm by weight, and the moisture was 9 ppm by weight.

Preparation Example A8

$LiPF_6$ was obtained as crystals in the same manner as in Preparation Example A1, except that 188 kg of phenyl chloroformate (ClCOOR, R: phenyl) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 98.2%, the concentration of free hydrofluoric acid was 95 ppm by weight, and the moisture was 9 ppm by weight.

Comparative Example A1

As a reaction solvent, 188 g of dimethyl carbonate ($R_1OCOOR_2$, $R_1$ & $R_2$: —$CH_3$) was added to a PTFE-lined reactor, and then 10.7 g of lithium fluoride (LiF) (s) was added and then stirred to disperse in the reaction solvent. When a uniform dispersion was obtained, $PF_5$ gas was slowly introduced through the inlet tube while the reactor temperature was cooled to 10° C. or lower and the reactor pressure was maintained at 1.2 $kg/cm^2g$, and the reaction proceeded. As LiF was consumed, $LiPF_6$ dissolved in the solvent was produced. The reaction was terminated when all of the LiF was consumed, and the reaction solution was concentrated in vacuum at 0 to 50° C. to obtain $LiPF_6$ as crystals.

The production of standard $LiPF_6$ was confirmed by $^{19}F$ NMR spectrum ((470.40 MHz, $CD_3CN$): d −71.48 (d, J=705.6)) and the yield was 98%. The purity was 98.1%, the concentration of free hydrofluoric acid was 186 ppm by weight, and the moisture was 8 ppm by weight.

Comparative Example A2

$LiPF_6$ was obtained as crystals in the same manner as in Comparative Example A1, except that 188 g of ethyl methyl carbonate ($R_1OCOOR_2$, $R_1$: —$CH_2CH_3$ & $R_2$: —$CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 98.8%, the concentration of free hydrofluoric acid was 212 ppm by weight, and the moisture was 8 ppm by weight.

Comparative Example A3

$LiPF_6$ was obtained as crystals in the same manner as in Comparative Example A1, except that 188 g of diethyl carbonate ($R_1OCOOR_2$, $R_1$ & $R_2$: —$CH_2CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 98.1%, the concentration of free hydrofluoric acid was 209 ppm by weight, and the moisture was 9 ppm by weight.

Comparative Example A4

$LiPF_6$ was obtained as crystals in the same manner as in Comparative Example A1, except that 188 g of methyl formate (HCOOR, R: —$CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 97.6%, the concentration of free hydrofluoric acid was 266 ppm by weight, and the moisture was 8 ppm by weight.

Comparative Example A5

$LiPF_6$ was obtained as crystals in the same manner as in Comparative Example A1, except that 188 g of ethyl formate (HCOOR, R: —$CH_2CH_3$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 97.5%, the concentration of free hydrofluoric acid was 281 ppm by weight, and the moisture was 8 ppm by weight.

Comparative Example A6

$LiPF_6$ was obtained as crystals in the same manner as in Comparative Example A1, except that 188 g of acetonitrile ($CH_3CN$) was added as a reaction solvent.

The production of standard $LiPF_6$ was confirmed by $^{19}F$ NMR spectrum ((470.40 MHz, $CD_3CN$): d −71.48 (d, J=705.6)) and the yield was 98%. The purity was 98.1%, the concentration of free hydrofluoric acid was 254 ppm by weight, and the moisture was 10 ppm by weight.

Comparative Example A7

$LiPF_6$ was obtained as crystals in the same manner as in Comparative Example A1, except that 340 g of anhydrous HF was added as a reaction solvent.

The production of standard $LiPF_6$ was confirmed by $^{19}F$ NMR spectrum ((470.40 MHz, $CD_3CN$): d −71.48 (d, J=705.6)) and the yield was 88%. The purity was 99.985%, the concentration of free hydrofluoric acid was 28 ppm by weight, and the moisture was 8 ppm by weight.

TABLE 1

| | reaction solvent | | $LiPF_6$ yield (%) | $LiPF_6$ purity (wt %) | Free HF (wt ppm) | moisture (wt ppm) |
|---|---|---|---|---|---|---|
| Preparation Example A1 | ClCOOR | R:—$CH_3$ | 99.9 | 99.985 | 30 | 8 |
| Preparation Example A2 | | R:—$CH_2CH_3$ | 99.9 | 99.985 | 30 | 9 |
| Preparation Example A3 | | R:—$CH{=}CH_2$ | 99 | 99.9 | 55 | 9 |
| Preparation Example A4 | | R:—$(CH_2)_2CH_3$ | 99 | 99.8 | 62 | 9 |
| Preparation Example A5 | | R:—$CH_2CH{=}CH_2$ | 99 | 99.1 | 60 | 10 |
| Preparation Example A6 | | R:—$(CH_2)_3CH_3$ | 99 | 98.9 | 85 | 9 |
| Preparation Example A7 | | R:—$(CH_2)_5CH_3$ | 98 | 98.4 | 67 | 9 |
| Preparation Example A8 | | R:phenyl | 98 | 98.2 | 95 | 9 |
| Comparative Example A1 | $R_1OCOOR_2$ | $R_1$ & $R_2$:—$CH_3$ | 98 | 98.1 | 186 | 8 |
| Comparative Example A2 | | $R_1$:—$CH_2CH_3$ & $R_2$:—$CH_3$ | 98 | 98.8 | 212 | 8 |
| Comparative Example A3 | | $R_1$ & $R_2$:—$CH_2CH_3$ | 98 | 98.1 | 209 | 9 |
| Comparative | HCOOR | R:—$CH_3$ | 98 | 97.6 | 266 | 8 |

TABLE 1-continued

| | reaction solvent | $LiPF_6$ yield (%) | $LiPF_6$ purity (wt %) | Free HF (wt ppm) | moisture (wt ppm) |
|---|---|---|---|---|---|
| Example A4 | | | | | |
| Comparative Example A5 | R:—$CH_2CH_3$ | 98 | 97.5 | 281 | 8 |
| Comparative Example A6 | $CH_3CN$ | 98 | 98.1 | 254 | 10 |
| Comparative Example A7 | anhydrous HF | 88 | 99.985 | 28 | 8 |

Referring to Table 1, in the case of the method according to each of Comparative Examples A1 to A7, lithium hexafluorophosphate was obtained as a solution because lithium hexafluorophosphate has a high solubility in the solvent used, and the solution was concentrated to obtain lithium hexafluorophosphate as a crystal. On the other hand, in the methods according to each of Preparation Examples A1 to A8, the lithium hexafluorophosphate has low solubility in the haloformate-based solvent used, and thus the produced lithium hexafluorophosphate could be precipitated as crystals in the solvent without a concentration process. Therefore, no additional concentration process is necessary to obtain lithium hexafluorophosphate as crystals, so that the cost can be reduced and the yield is also improved.

In addition, in the methods according to each of Comparative Examples A1 to A7, it can be seen that during the concentration process, lithium hexafluorophosphate is decomposed by heat to generate free hydrofluoric acid. In addition, the concentration process also has the disadvantage that can cause a color change of the solution. As a result, the purity of the obtained lithium hexafluorophosphate may be low. On the other hand, in the method according to each of Preparation Examples A1 to A8, it can be seen that the content of free hydrofluoric acid as an impurity is very low and the purity is very excellent.

In addition, in the case of the method according to each of Preparation Examples A1 to A5 using an alkyl or alkenyl group having 1 to 3 carbon atoms as the reaction solvent, it can be seen that the purity of lithium hexafluorophosphate is improved compared to the method according to each of Preparation Examples A6 to A8. Further, in the case of the method according to each of Preparation Examples A1 to A2 using an alkyl group having 1 to 2 carbon atoms as the reaction solvent, it can be seen that the purity is further improved and the yield is also improved.

Figure 4:
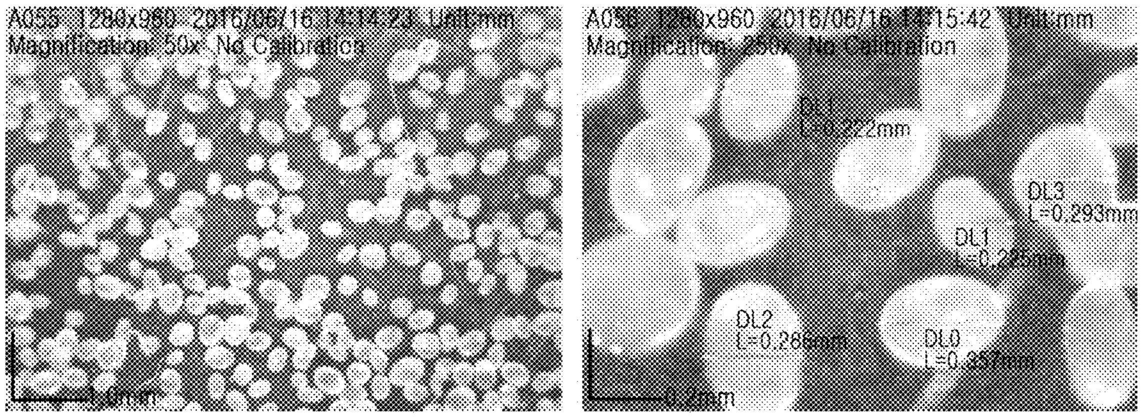
FIGS. 4 and 5 are electron microscope images taken of the particles according to Preparation Example A1 and Comparative Example A7, respectively.
Figure 5:
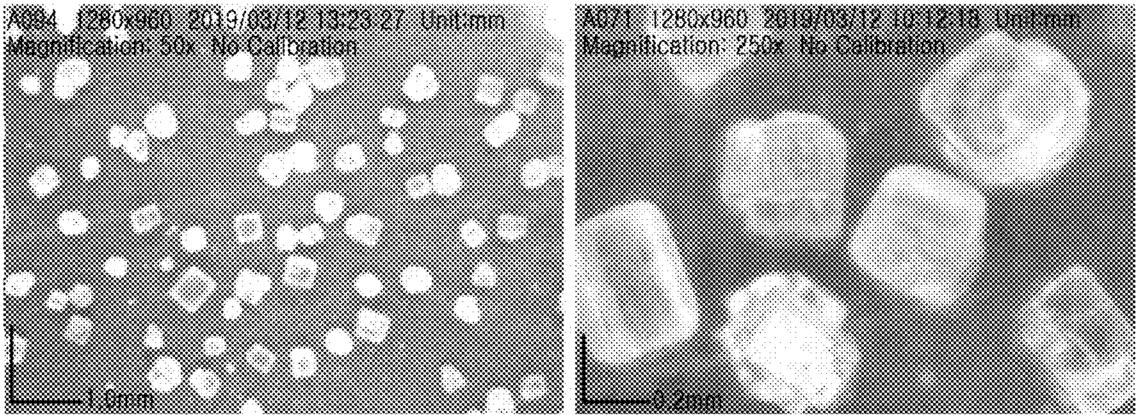
Figure 6A:
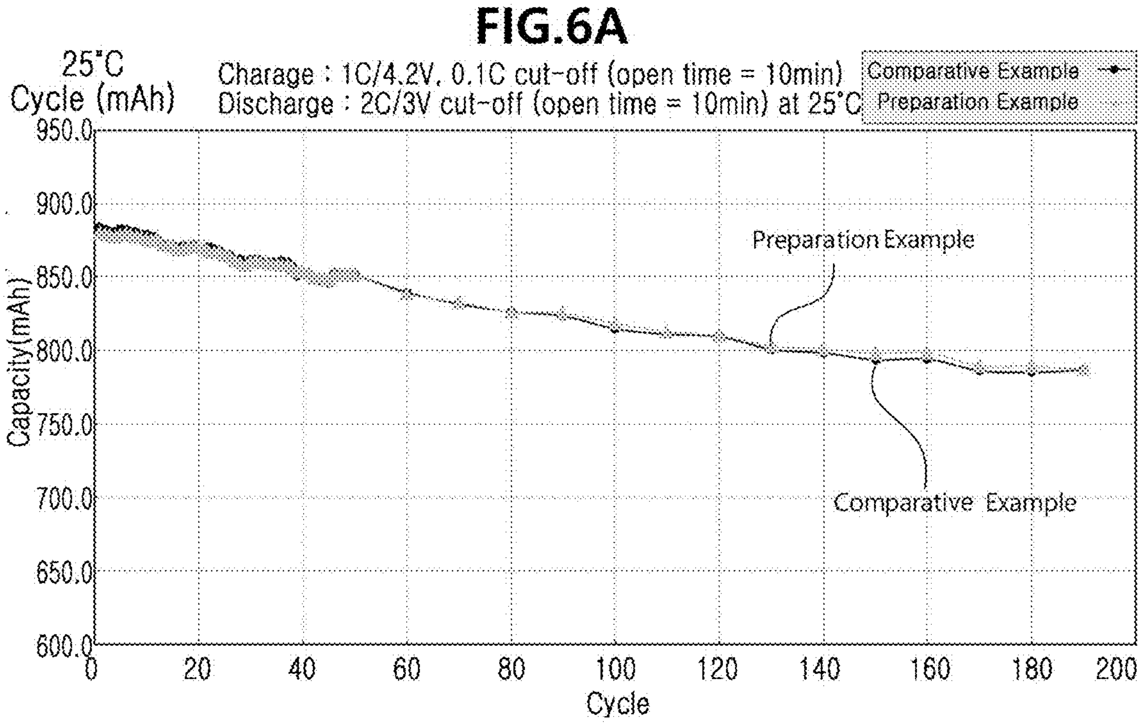
FIG. 6A is a graph illustrating a change in capacity according to cycle number of lithium secondary batteries according to Preparation Example and Comparative Example.
Figure 6B:
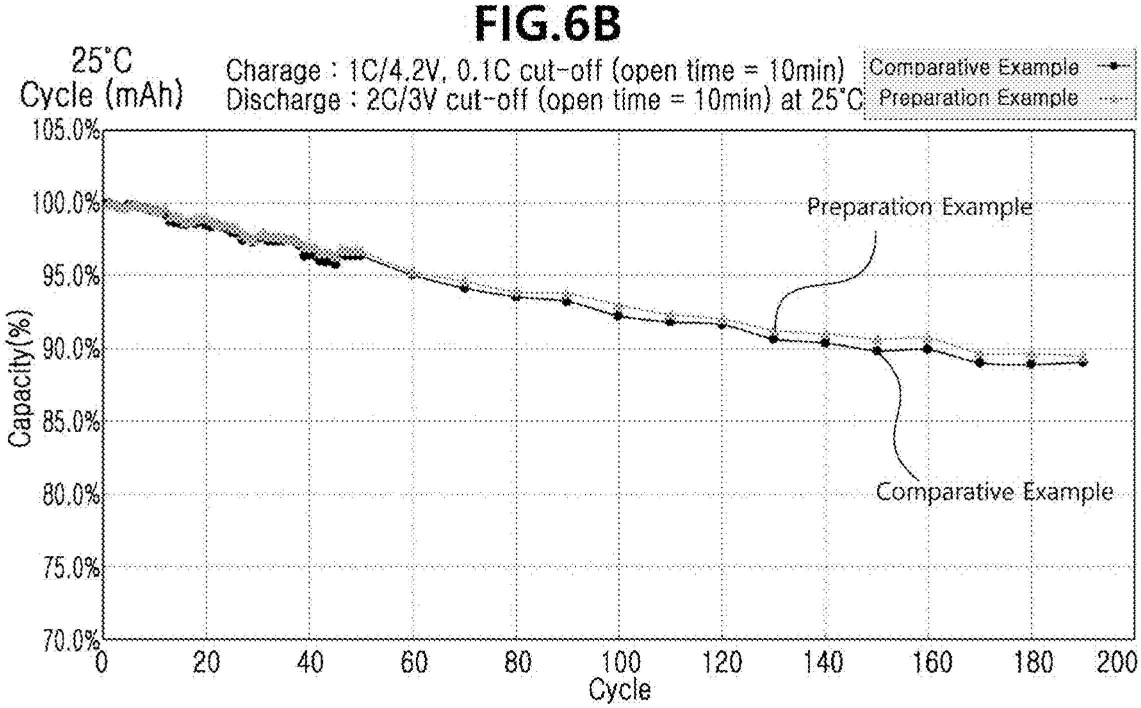
FIG. 6B is a graph illustrating a capacity retention ratio according to cycle number of lithium secondary batteries according to Preparation Example and Comparative Example.

FIGS. 4 and 5 are electron microscope images taken of the particles according to Preparation Example A1 and Comparative Example A7, respectively.

Referring to FIGS. 4 and 5, it can be seen that the particles according to Preparation Example A1 have an ellipsoid-like form. On the other hand, it can be seen that the particles according to Comparative Example A7 have a cuboid shape.

Preparation Example of $LiPF_6$ Solution

Preparation Examples B11

74 kg of diethyl carbonate was added to a reactor, followed by stirring while maintaining the temperature at 20° C. or lower. 60 kg of lithium hexafluorophosphate obtained through Preparation Example A1 was added to the stirred diethyl carbonate, but slowly added to prevent the internal temperature from rising above 40° C. After the addition, the mixture was stirred for about 1 hour to completely dissolve lithium hexafluorophosphate, and the temperature of the reactor was increased to 40° C., and vacuum concentration was performed while passing nitrogen gas at the bottom of the reactor. Diethyl carbonate was evaporated during the concentration and free fluoric acid and chlorine ions were also removed. Diethyl carbonate was added to the concentrated product to make the concentration 30-32±0.5 wt %, and the purity of the solution was improved by removing a small amount of lithium fluoride through a filter.

Preparation Examples B2

A lithium hexafluorophosphate solution was prepared in the same manner as in Preparation Example B1 except that ethyl methyl carbonate was added as the reaction solvent.

Preparation Examples B3

A lithium hexafluorophosphate solution was prepared in the same manner as in Preparation Example B1 except that diethyl carbonate was added as the reaction solvent.

Preparation Example of Lithium Secondary Battery

Preparation Example

A lithium secondary battery was manufactured by forming a positive electrode active material layer using mixed $LiCoO_2$ and Li $(Ni_{0.8}Co_{0.15}Al_{0.05})O_2$, forming a negative electrode active material layer using graphite, disposing a glass filter separator, and injecting an electrolyte solution in which $LiPF_6$ crystals according to $LiPF_6$ Preparation Example A1 were dissolved in diethyl carbonate at a concentration of 1 M between the positive active material layer and the negative electrode active material layer.

Comparative Example

A lithium secondary battery was manufactured in the same manner as in Preparation Example, except that an electrolyte solution in which $LiPF_6$ crystals according to Comparative Example A7 were dissolved in diethyl carbonate at a concentration of 1 M was used.

FIG. 5A is a graph illustrating a change in capacity according to cycle number of lithium secondary batteries according to Preparation Example and Comparative Example, and FIG. 5B is a graph illustrating a capacity retention ratio according to cycle number of lithium secondary batteries according to Preparation Example and Comparative Example.

Referring to FIGS. 5A and 5B, it can be seen that the lithium secondary battery according to Preparation Example exhibits a better capacity retention ratio than the lithium secondary battery according to Comparative Example.

As described above, according to the present inventive concept, by eliminating the crystallization step and/or concentration step for the precipitation of crystals of hexafluorophosphate salt, the process cost can be lowered, while the high purity hexafluorophosphate salt with improved yield and reduced impurities such as free hydrofluoric acid can be provided.

While the exemplary embodiments of the present inventive concept have been described above, those of ordinary skill in the art should understood that various changes, substitutions and alterations may be made herein without departing from the spirit and scope of the present inventive concept as defined by the following claims.

What is claimed is:

1. A method for preparing an electrolytic concentrate containing alkali metal hexafluorophosphate, the method comprising:

obtaining an alkali metal fluoride dispersion in the form of a slurry by dispersing alkali metal fluoride in a solid state in a haloformate solvent represented by Formula 1 below; and reacting the alkali metal fluoride in the haloformate solvent with phosphorus pentafluoride ($PF_5$) in a gaseous state supplied into the alkali metal fluoride dispersion to obtain the alkali metal hexafluorophosphate as a precipitate in the haloformate solvent through the following Scheme 2:

[Formula 1]

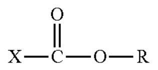

wherein in Formula 1,

X is a F, Cl, Br or I, and

R is an alkyl group having 1 to 6 carbon atoms, an alkenyl group having 2 to 6 carbon atoms, or an aryl group having 5 to 6 ring atoms, $$MF(s)+PF_5(g)\rightarrow MPF_6(s) \quad \text{[Scheme 2]}$$

wherein in Scheme 2, M is an alkali metal, MF is the alkali metal fluoride, $MPF_6$ is the alkali metal hexafluorophosphate.

2. The method of claim 1, wherein X is Cl.

3. The method of claim 1, wherein R is an alkyl group having 1 to 3 carbon atoms.

4. The method of claim 3, wherein R is a methyl group or an ethyl group.

5. The method of claim 1, wherein the alkali metal fluoride is LiF, and the alkali metal hexafluorophosphate is $LiPF_6$.

6. The method of claim 1, wherein obtaining the alkali metal fluoride dispersion and reacting the phosphorus pentafluoride with the alkali metal fluoride is performed in different reactors.

7. The method of claim 1, further comprising, before reacting the phosphorus pentafluoride with the alkali metal fluoride in the haloformate solvent, obtaining the phosphorus pentafluoride by reacting liquid phosphorus trichloride ($PCl_3$), liquid chlorine ($Cl_2$), and liquid hydrogen fluoride (HF).

8. The method of claim 7, wherein the phosphorus pentafluoride is obtained in a gas mixture with hydrogen chloride when the phosphorus pentafluoride is obtained by reacting the liquid phosphorus trichloride ($PCl_3$), the liquid chlorine ($Cl_2$), and the liquid hydrogen fluoride (HF), and the phosphorus pentafluoride is supplied as the gas mixture with the hydrogen chloride when the alkali metal fluoride is reacted with the phosphorus pentafluoride in the haloformate solvent.

9. The method of claim 8, wherein hydrogen chloride remaining in the reaction of the phosphorus pentafluoride with the alkali metal fluoride in the haloformate solvent is supplied into a hydrogen chloride absorber and discharged as an aqueous solution of hydrogen chloride.

10. The method of claim 8, wherein obtaining the alkali metal fluoride dispersion and reacting the phosphorus pentafluoride with the alkali metal fluoride is performed in different reactors, and wherein the phosphorus pentafluoride and hydrogen chloride mixture remaining in the reaction of the phosphorus pentafluoride and the alkali metal fluoride is fed into a reactor where obtaining the alkali metal fluoride dispersion is performed, the phosphorus pentafluoride in the mixture is reacted with the alkali metal fluoride in the alkali metal fluoride dispersion, and hydrogen chloride remaining is supplied into a hydrogen chloride absorber and discharged as an aqueous solution of hydrogen chloride.

11. The method of claim 1, further comprising, filtering the precipitated alkali metal hexafluorophosphate to separate alkali metal hexafluorophosphate, and drying the separated alkali metal hexafluorophosphate under reduced pressure.

12. The method of claim 1, wherein the alkali metal hexafluorophosphate is precipitated as crystal particles in an ellipsoid form.

13. The method of claim 12, wherein at least two of three semiprincipal axes of the crystal particles in the ellipsoid form have different lengths or all of the semiprincipal axes have different lengths.

14. The method of claim 13, wherein the length of the at least one of the semiprincipal axes is several hundred micrometers in size.

15. A method for preparing an electrolytic concentrate containing an alkali metal hexafluorophosphate, comprising:

preparing the alkali metal hexafluorophosphate according to claim 1;

dissolving the alkali metal hexafluorophosphate in a non-aqueous organic solvent to obtain an alkali metal hexafluorophosphate solution;

concentrating the alkali metal hexafluorophosphate solution into a saturated solution.

16. The method of claim 15, wherein the non-aqueous organic solvent is an acyclic- or cyclic-carbonate ester, a lactone, an acyclic- or a cyclic-ether, or a mixture thereof.

17. The method of claim 15, further comprising diluting the saturated solution of the alkali metal hexafluorophosphate by adding the non-aqueous organic solvent.

18. A method for manufacturing a secondary battery, comprising:

obtaining an alkali metal hexafluorophosphate solution by dissolving the alkali metal hexafluorophosphate prepared according to claim 1 in a non-aqueous organic solvent; and introducing the alkali metal hexafluorophosphate solution as an electrolyte between a negative electrode active material layer and a positive electrode active material layer.

19. The method of claim 18, wherein the non-aqueous organic solvent is an acyclic- or cyclic-carbonate ester, a lactone, an acyclic- or a cyclic-ether, or a mixture thereof.

* * * * *